United States Patent
Zhang et al.

(10) Patent No.: US 10,440,604 B2
(45) Date of Patent: Oct. 8, 2019

(54) UPLINK CONGESTION MITIGATION

(71) Applicant: Intel Corporation, Santa Clara, CA (US)

(72) Inventors: Menglei Zhang, Santa Clara, CA (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/868,722

(22) Filed: Jan. 11, 2018

(65) Prior Publication Data
US 2019/0045388 A1 Feb. 7, 2019

(51) Int. Cl.
H04W 28/02 (2009.01)
H04W 24/08 (2009.01)
H04L 29/06 (2006.01)
H04W 28/12 (2009.01)

(52) U.S. Cl.
CPC ......... H04W 28/0273 (2013.01); H04L 69/16 (2013.01); H04W 24/08 (2013.01); H04W 28/0231 (2013.01); H04W 28/0284 (2013.01); H04W 28/0289 (2013.01); H04W 28/12 (2013.01)

(58) Field of Classification Search
CPC ............ H04W 28/0273; H04W 24/08; H04W 28/0231; H04W 28/0284; H04W 28/0289; H04W 28/12; H04L 69/16
See application file for complete search history.

(56) References Cited

U.S. PATENT DOCUMENTS

2017/0063498 A1* 3/2017 Venkatsuresh ............ H04L 1/16

OTHER PUBLICATIONS

"Potential hurdle in maximising DL TCP throughput", 3GPP TSG-RAN WG2 #96 R2-168036 Revision of R2-167159, (Nov. 2016), 3 pgs.
"Radio Bearer Handling and Challenges for 5G", 3GPP TSG-RAN WG2 Meeting #93b R2-163775 (Update of R2-162241), (Apr. 2016), 6 pgs.

* cited by examiner

Primary Examiner — Ronald B Abelson
(74) Attorney, Agent, or Firm — Schwegman Lundberg & Woessner, P.A.

(57) ABSTRACT

System and techniques for uplink congestion mitigation are described herein. A packet acknowledgement (ACK) rate may be measured in a transmission queue to detect when the ACK rate exceeds a threshold. In response to the ACK rate exceeding the threshold, ACKs may be removed from the transmission queue in accordance with a time-based uplink reduction function. ACKs that remain in the transmission queue after ACKs are removed in accordance with the time-based uplink reduction function may then be transmitted.

24 Claims, 11 Drawing Sheets

UPLINK CONGESTION MITIGATION

TECHNICAL FIELD

Embodiments described herein generally relate to computer networking and more specifically to uplink congestion mitigation.

BACKGROUND

The transmission control protocol (TCP) is a network communication standard at the transport layer of a networking stack. TCP generally provides facilities to reliably (e.g., in order, error checked, with re-transmission, etc.) transport data via an internet protocol (IP) between host devices. TCP generally includes establishing connections between hosts and transferring data over established connections. Thus, TCP may involve greater setup than stateless protocols, such as the user datagram protocol (UDP). In addition to providing facilities for error checking, in-order delivery, and retransmission of data, TCP also includes a number of congestion recognition and mitigation capabilities.

TCP operates at a network layer somewhat higher than the physical (PHY) or media access (MAC) layers. In next generation wireless networks, these PHY and MAC layers are evolving to include more radio bands in a wider range of frequencies than have generally been used in the past. Millimeter wave PHY layers are becoming more common with the next generation wireless networks. Millimeter wave radio band communications for next generation wireless networks may provide significant bandwidth and latency benefits. Often, bands are structured such that downlink (e.g., from the network to a device) channels have more bandwidth than uplink channels, to address likely use cases in which the uplink is used primarily to transmit compact query data or acknowledgments (ACKs) from the device to the network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
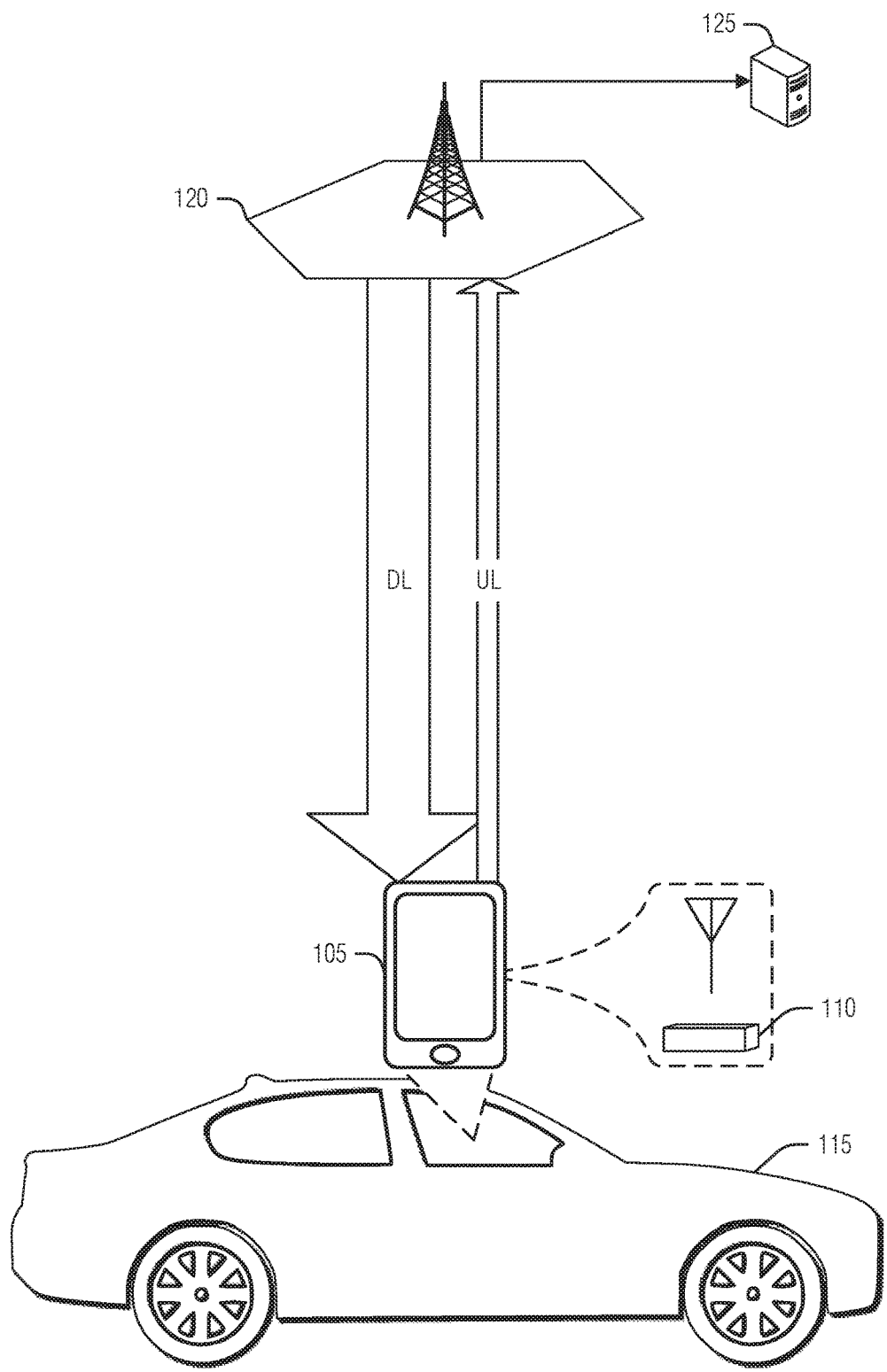
FIG. 1 is a block diagram of an example of an environment including a system for uplink congestion mitigation, according to an embodiment.

Next generation wireless networks (e.g., cellular systems) may provide very high peak data rates (e.g., ten gigabits per second (Gbps)) by using higher frequency portions of the radio spectrum (e.g., millimeter wave) than were used previously. However, these higher frequency bands are often highly sensitive to environmental conditions, such as signal interference from buildings, vehicles, or even atmospheric moisture, leading to disproportionately high path losses when compared to lower frequency bands as transceivers move away from each other.

To achieve high data rates expected by users, next generation wireless networks are likely to disproportionality allocate radio resource to the downlink (DL) (e.g., from network infrastructure to user equipment (UE)) at the expense of uplink (UL) allocations. Thus, in accordance with the peak data rate expectations, fifth generation (5G) cellular networks may allocate radio resources to achieve twenty Gbps in the downlink and ten Gbps in the uplink.

Because TCP uses ACKs to prevent a sender from retransmitting the data, uplink resources are required to send the ACKs in proportion to data received in the downlink. A typical IP packet size of a TCP ACK is fifty-two bytes, of which thirty-two bytes are devoted to the TCP header and twenty bytes are devoted to the IP version four (IPv4) header. If IP version 6 (IPv6) is used, then the ACK is increased to seventy-two bytes to accommodate the forty byte IPv6 header. By comparing a typical IP packet size of a TCP segment, 1500 bytes, the uplink data rate required for the target downlink data rate may be derived. However, the TCP receiver side may not issue a TCP ACK for every TCP segment due to delayed ACKs. In a stream of full-sized segments, there may be an ACK for every second segment. Typical TCP implementations follow this behavior. Subsequently, the required uplink data rate may be derived as follows:

In IPv4 the required uplink data rate is equal to the downlink $$\text{peak rate} * \frac{52}{2*1500},$$

and

In IPv6 the required uplink data rate is equal to the downlink $$\text{peak rate} * \frac{72}{2*1500}.$$

The table below illustrates a few concrete examples:

| | Required UL data rate | |
|---|---|---|
| DL peak rate | IPv4 | IPv6 |
| 5 Gbps | 86.7 Mbps | 120 Mbps |
| 20 Gbps | 346.7 Mbps | 480 Mbps |

Due to the possible radio link interruptions for high frequency bands, as well as the disparity between downlink and uplink radio resource allocations, a situation may arise in which the uplink resources needed to properly convey TCP ACKs are unavailable. In these cases, TCP receive uplink buffers may fill, increasing latency, or underutilizing radio link resources.

A technique to mitigate uplink congestion due to heavy TCP ACK traffic is to drop some TCP ACKs. This technique, however, may lead to burst TCP data traffic arrival and slower growth of the TCP congestion window (a sender controlled parameter to reduce downlink data rates) during the TCP slow start phase. Further, discarding TCP ACKs may adversely affect some TCP flows (e.g., streams) or cause an increase downlink data rate due to data retransmissions.

To address these TCP ACK filtering issues, a TCP ACK presence rate is calculated based on uplink grants and transmission queue status to determine whether uplink congestion is occurring. If congestion is detected, ACKs are discarded in proportion to the congestion and contribution by various TCP flows. Thus, if a fifty percent reduction in uplink resources (e.g., fifty percent congestion) is determined to needed to mitigate the congestion, one out of every two TCP acks is discarded (e.g., between six ACKs, the first, third, and fifth are discarded) to mitigate a collection of retransmissions or transmissions occurring at the same time. Moreover, if a first flow has two ACKs and a second flow has four ACKs, one ACK from the first flow and two from the second flow will be removed to maintain proportionality between the flows. Additionally, because TCP ACK filtering results in a net negative during the TCP slow start phase of a TCP connection, flows in this slow start phase will not have any ACKs removed. To further smooth the retransmission traffic flow, discarding TCP ACKs may be smoothed over multiple uplink resource grants, using consecutive uplink grant intervals to minimize the total number of dropped ACKs within any given time period while still reducing, or eliminating, uplink congestion. Additional details and examples are provided below.

FIG. 1 is a block diagram of an example of an environment including a system for uplink congestion mitigation, according to an embodiment. The environment includes a TCP endpoint 125, such as a server, content provider, etc. providing downlink data to the device 105 (e.g., a UE, stat (STA), tablet, computer, etc.) via the network infrastructure 120 (e.g., an access point (AP), enhanced NodeB (eNb), etc.). The device 105 is illustrated within a vehicle 115, the mobility of which may lead to greater uplink congestion issues. In an example, the device 105 may be part of the vehicle 115.

The device 105 includes a network controller 110 (e.g., NIC, processing circuitry, etc.) coupled to an antenna to communicate with the TCP endpoint 125 via the network infrastructure 120. To implement uplink congestion mitigation, the network controller 110 is arranged to measure a packet ACK rate in a transmission queue to detect when the packet ACK rate exceeds a threshold. This measurement enables the network controller 100 to determine whether uplink congestion is an issue. In an example, the ACK rate is calculated by $$R = \frac{\{R*\max(0,(T-d)) + \min(d,T)r\}T}{T},$$

where R is the ACK rate, T is a measurement window, d is a measurement interval since a last sample, and r is the instant ACK presence rate. In an example, the value r is set to 1 if the current UL grant is not big enough for sending all TCP ACKs in the transmission queue, and 0 otherwise.

The network controller 110 is arranged to remove ACKs from the transmission queue in accordance with a time-based uplink reduction function in response to the ACK rate exceeding the threshold. The time-based uplink reduction function specifies the manner in which to remove the TCP ACKs in order to achieve uplink congestion mitigation while also minimizing the number of ACKs removed within a given time period. In an example, the time-based uplink reduction function removes a percentage of ACKs to meet a percentage that corresponds to the threshold. Thus, if the threshold is a seventy-five percent congested threshold, then the time-based uplink reduction function may designate the removal of seventy-five percent of the ACKs in the transmission queue. In an example, the percentage is expressed as a reduced ratio of ACKS to keep over ACKs to remove. Thus, if the percent is seventy-five, then the reduced ratio is three in four. In an example, ACKs are removed in accordance with the ratio. Using the reduced ratio (e.g., three in four rather than six in eight) maintains a minimal ACK removal for a given time period. Thus, at three in four, three ACKs are removed and one is transmitted, then three ACKs are removed and one is transmitted, and so on. In an example, the time-based uplink reduction function includes a smoothing factor to smooth ACK bursts over multiple uplink grant intervals. Smoothing across longer time horizons (here measured in uplink grant intervals) may reduce burst retransmissions, further alleviating uplink allocation issues.

In an example, multiple traffic flows (e.g., from applications, operation systems, etc. on the device 105) deposit ACKs into the transmission queue. In an example, the network controller 110 is arranged to remove ACKs from the multiple traffic flows in proportion to ACKs contributed by each of the multiple traffic flows. This prevents a single application from experiencing disproportionate latency, or delay, due to ACK filtering.

In an example, one of the multiple TCP flows is a TCP slow start flow (e.g., during a TCP slow start phase in establishing the TCP connection to the TCP endpoint 125). In an example, ACKs from the slow start flow are not removed from the transmission queue.

The network controller 110 is arranged to transmit ACKs that remain in the transmission queue after ACKs are removed in accordance with the time-based uplink reduction function. In an example, the ACKs are transmission control protocol (TCP) ACKs. In an example, the ACKS are removed from the transmission queue is a packet data convergence protocol (PDCP) layer of a network stack. In an example, the physical layer (e.g., radio link) of the network stack is a millimeter wave radio link.

Figure 2:
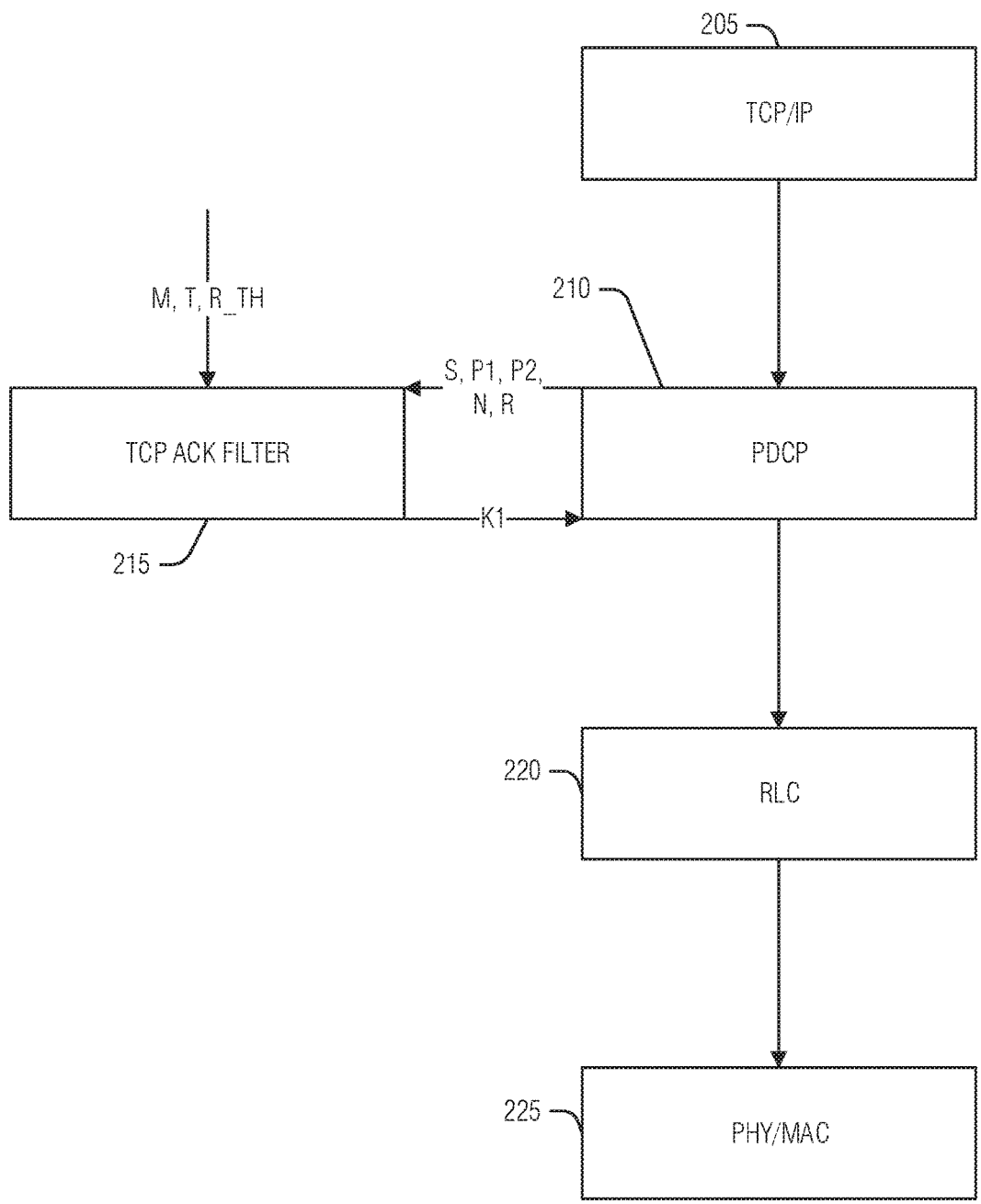
FIG. 2 is a block diagram of component communications for uplink congestion mitigation, according to an embodiment.

FIG. 2 is a block diagram of component communications for uplink congestion mitigation, according to an embodiment. The illustrated network components include a TCP/IP layer 205 (e.g., software or hardware interfacing with operating systems, applications, etc.), a packet data convergence (PDCP) 210 component (e.g., IP block, integrated circuit, processing circuitry, etc.), a radio link control (RLC) 220 component, a PHY/MAC 225 component, and a TCP ACK filter 215.

The TCP ACK filter 215 produces an ACK filtering parameter K1 that is used by the PDCP 210 to filter TCP ACKS before they are communicated to the RLC 220. To produce K1, the TCP ACK filter 215 accepts the following inputs
R: the estimated TCP ACK presence rate;
T: the measurement window (e.g. one hundred milliseconds);
d: the measurement interval of the last sample; and
r: the instant TCP ACK presence rate:
1: the current grant is not enough for all TCP ACK packets in the transmission queue; and
0: the current grant is enough for all TCP ACK packet in the transmission queue.
and computes the TCP ACK presence rate R, when receiving an uplink grant, as follows:

$$R = \frac{\{R*\max(0, (T-d)) + \min(d, T)r\}}{T}$$

In an example, TCP ACK filtering will be triggered only if R>Rth, where Rth is a pre-defined threshold (e.g., 0.9). The following measurements, or state variables, may also be used:
P1[i]: the number of queued ACKs for flow #i, where #i is the UE port number of the TCP flow;
N: number of the flows that have TCP ACKs in the queue (e.g., max=$2^{16}$ flows);
P2: the total number of queued ACKs of all flows;
K1[i]: the number of to-be-dropped ACKs for flow i;
K2: the total number of to-be-dropped ACKs; and
S: the total number of ACKs that may be scheduled in the current uplink grant;
as described below with respect to FIG. 3.

Figure 3:
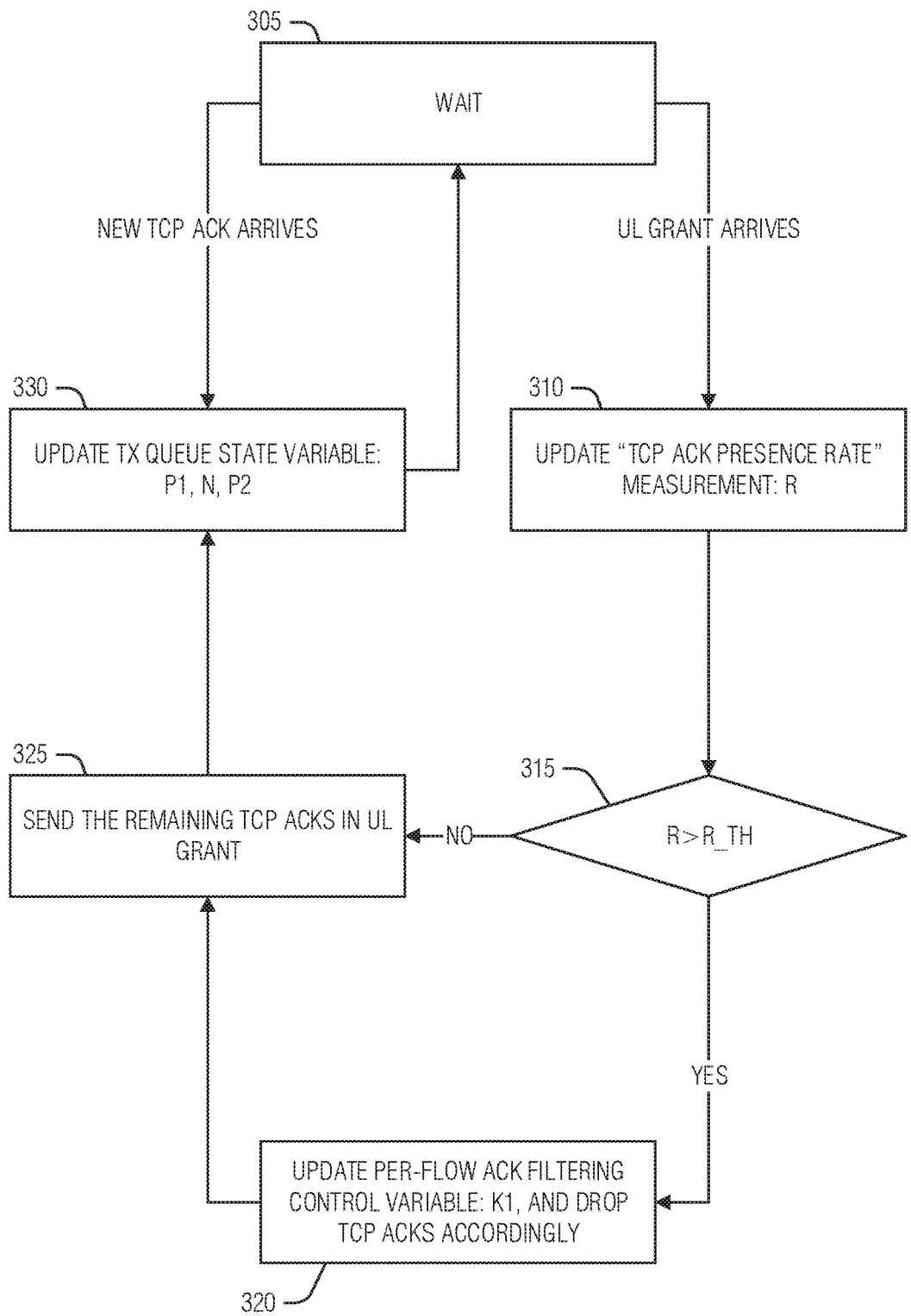
FIG. 3 illustrates a flow diagram of an example of a method for uplink congestion mitigation, according to an embodiment.

FIG. 3 illustrates a flow diagram of an example of a method 300 for uplink congestion mitigation, according to an embodiment. The operations of the method 300 are implemented in electronic hardware, such as that described above or below (e.g., processing circuitry). The method 300 begins by waiting for an event (operation 305), such as the arrival of a new TCP ACK or an uplink (UL) grant (e.g., radio resource allocation from network infrastructure).

In response to a new TCP ACK of flow i arrives, the following state variables are set (operation 330) as follows:
N is incremented by one (e.g., N++)
P1[i] and P2 are each incremented by one (e.g., P1[i]++ and P2++)
and the method 300 waits for another event (operation 305).

In response to an uplink grant, the TCP ACK presence rate R is updated (operation 310) as follows:

$$R = \frac{\{R*\max(0, (T-d)) + \min(d, T)r\}}{T}$$

and R is compared to the configuration variable Rth (decision 315) to determine whether ACK filtering is triggered. If no, the remaining TCP ACKS in the transmission queue will be sent (operation 325). Otherwise, the following state variables are set (operation 320) as follows:

$$K2 = \max\left(0, \frac{P2}{M} - S\right)$$

$$\text{IF } P1[i] \le S * \frac{M}{N}, \text{ then } K1[i] = 0$$

$$\text{ELSE } K1[i] = \min\left(P1[i] - 1, K2 * \text{floor}\left(\frac{P1[i]}{P2}\right)\right)$$

and TCP ACKS are filtered according to K1[i]. The IF statement determines whether the flow i is in a TCP slow start portion of the connection and specifies that no ACKs should be removed for that flow while in the slow start portion of the connection. M is a configuration variable used to smooth ACK filtering over multiple uplink grants. For example, no ACKs will be discarded (e.g., K2=0), while all the ACKs in the transmission queue are schedulable in M uplink grant intervals, assuming a grant size of S for each grant.

To ensure fairness, the number of dropped TCP ACKs, K1[i], is proportional to the number of TCP ACKs for each flow, $$\frac{P1[i]}{P2}.$$

If, however, a flow has too few ACKs in the transmission queue (e.g., for flow one, $$P1[1] < S * \frac{M}{N}),$$

then no ACKs of the flow are dropped to avoid performance impacts of ACK filtering during the TCP slow start phase.

The method 300 continues to send remaining TCP ACKs in the uplink grant (operation 325) and updates the state variables. State variable N is decremented by one (e.g., N--) when P1[i]=1 and otherwise the state variables P1[i] and P2 are decremented by one (e.g., P1[i]-- and P2--) (operation 330) to account for the TCP ACKs removed from the transmission queue. The method 300 then proceeds to wait for another event (operation 305).

Figure 4:
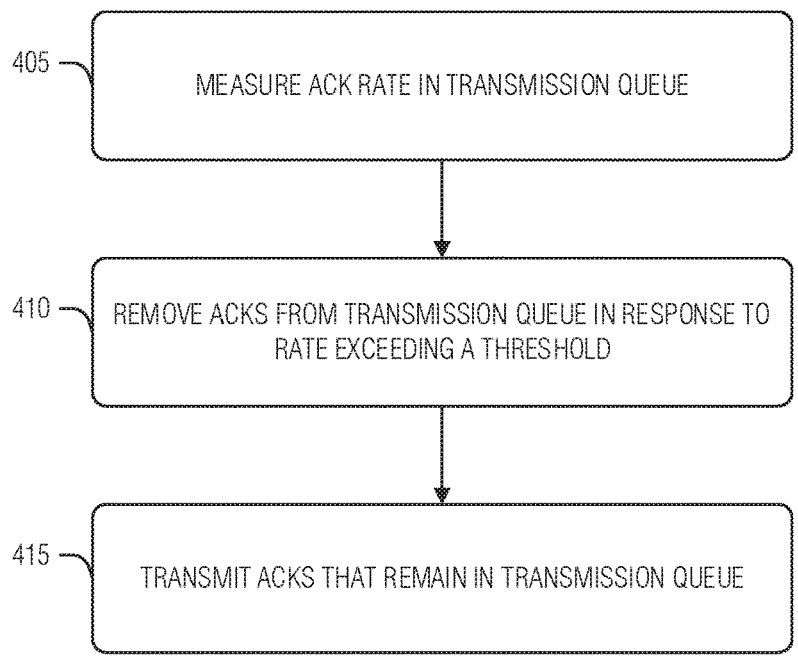
FIG. 4 illustrates a flow diagram of an example of a method for uplink congestion mitigation, according to an embodiment.

FIG. 4 illustrates a flow diagram of an example of a method 400 for uplink congestion mitigation, according to an embodiment. The operations of the method 400 are performed by electronic hardware, such as that described above or below (e.g., processing circuitry).

At operation 405, a packet ACK rate is measured in a transmission queue to detect when the ACK rate exceeds a threshold. In an example, the ACK rate is calculated by $$R = \frac{\{R*\max(0, (T-d)) + \min(d, T)r\}T}{T}.$$

Here, R is the ACK rate, T is a measurement window, d is a measurement interval since a last sample, and r is a count of ACKs in the transmission queue.

At operation 410, in response to the ACK rate exceeding the threshold, ACKs are removed from the transmission queue in accordance with a time-based uplink reduction function. In an example, the time-based uplink reduction function removes a percentage of ACKs to meet a percentage that corresponds to the threshold. In an example, the percentage is expressed as a reduced ratio of ACKs to keep over ACKs to remove. In an example, ACKs are removed in accordance with the ratio. In an example, the time-based uplink reduction function includes a smoothing factor to smooth ACK bursts over multiple uplink grant intervals.

In an example, multiple traffic flows deposit ACKs into the transmission queue. In an example, removing the ACKs from the transmission queue includes removing ACKs from the multiple traffic flows in proportion to ACKs contributed by each of the multiple traffic flows.

In an example, the ACKs are TCP ACKs. In an example, removing the ACKS from the transmission queue is performed at a PDCP layer of a network stack. In an example, a physical layer of the network stack is a millimeter wave radio link.

In an example, multiple TCP streams deposit ACKs into the transmission queue, with one stream being a TCP slow start flow. In an example, ACKs from the slow start flow are not removed from the transmission queue.

At operation 415, ACKs that remain in the transmission queue, after ACKs are removed in accordance with the time-based uplink reduction function, are transmitted.

Figure 5:
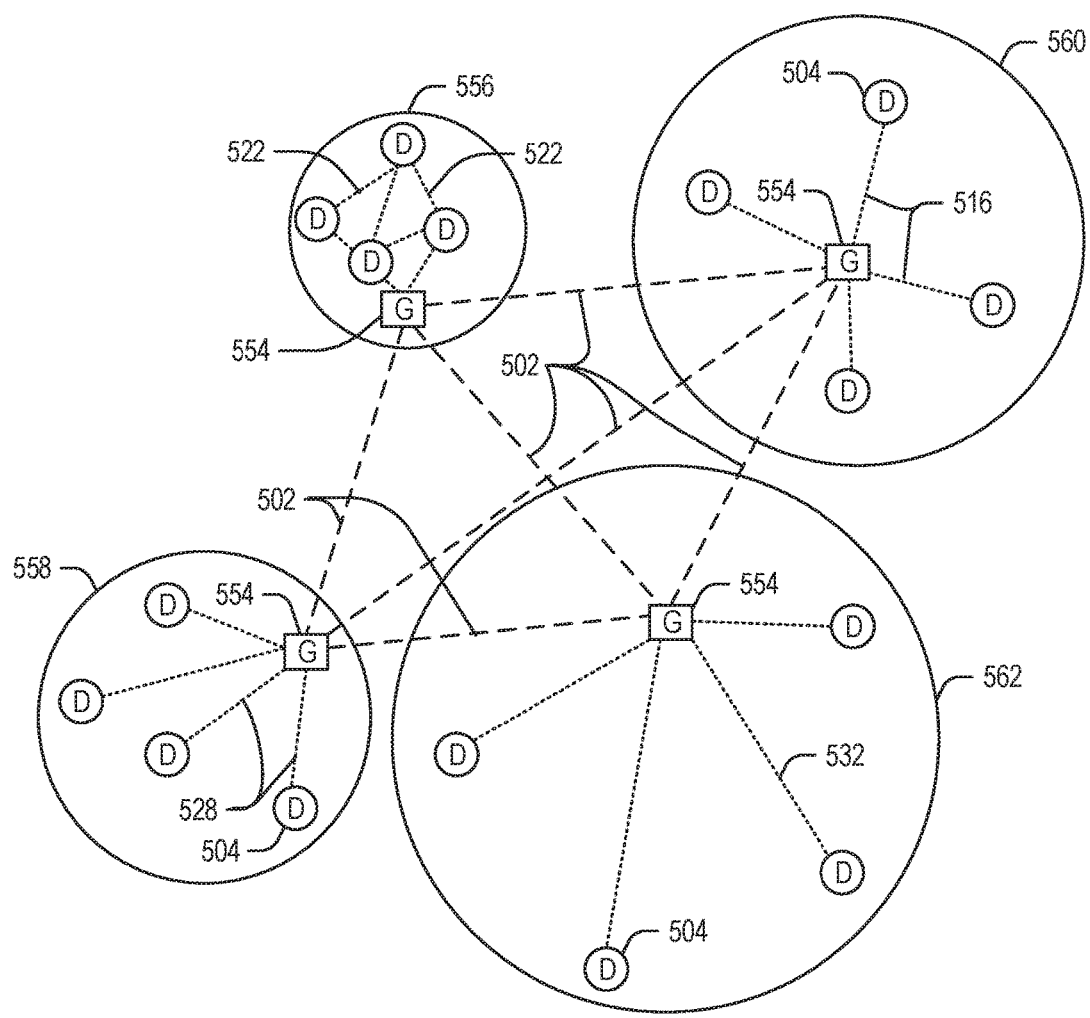
FIG. 5 illustrates an example domain topology for respective Internet of Things networks coupled through links to respective gateways, according to an embodiment.

FIG. 5 illustrates an example domain topology for respective Internet of Things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 6:
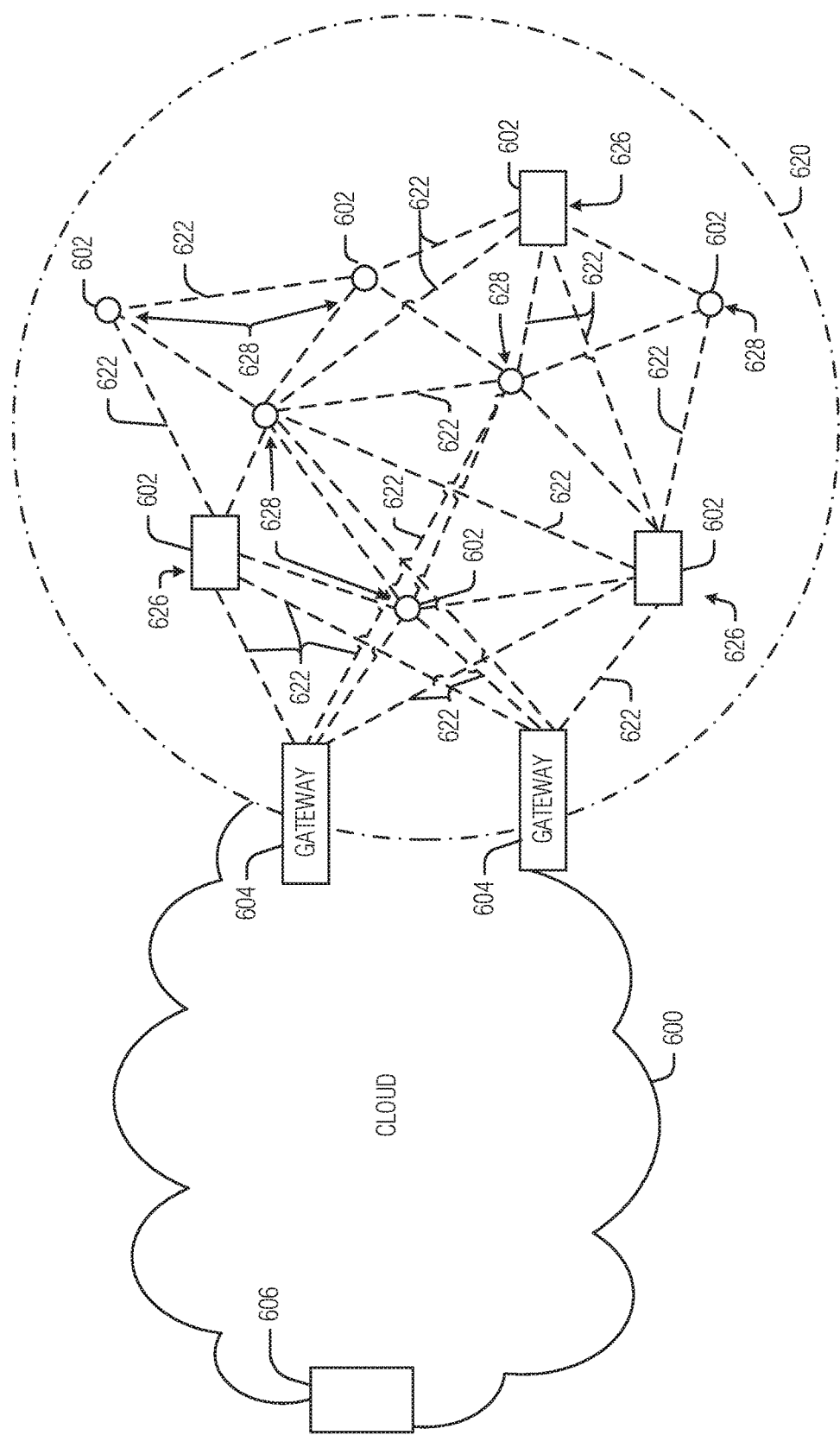
FIG. 6 illustrates a cloud computing network in communication with a mesh network of Internet of Things devices operating as a fog device at the edge of the cloud computing network, according to an embodiment.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 5 and 6, present a number of new challenges in a heterogeneous network of connectivity comprising a combination of wired and wireless technologies.

FIG. 5 specifically provides a simplified drawing of a domain topology that may be used for a number of Internet of Things (IoT) networks comprising IoT devices 504, with the IoT networks 556, 558, 560, 562, coupled through backbone links 502 to respective gateways 554. For example, a number of IoT devices 504 may communicate with a gateway 554, and with each other through the gateway 554. To simplify the drawing, not every IoT device 504, or communications link (e.g., link 516, 522, 528, or 532) is labeled. The backbone links 502 may include any number of wired or wireless technologies, including optical networks, and may be part of a local area network (LAN), a wide area network (WAN), or the Internet. Additionally, such communication links facilitate optical signal paths among both IoT devices 504 and gateways 554, including the use of MUXing/deMUXing components that facilitate interconnection of the various devices.

The network topology may include any number of types of IoT networks, such as a mesh network provided with the network 556 using Bluetooth low energy (BLE) links 522. Other types of IoT networks that may be present include a wireless local area network (WLAN) network 558 used to communicate with IoT devices 504 through IEEE 802.11 (Wi-Fi®) links 528, a cellular network 560 used to communicate with IoT devices 504 through an LTE/LTE-A (4G) or 5G cellular network, and a low-power wide area (LPWA) network 562, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 504, such as over the backbone links 502, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 556, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 558, for instance, may use systems that perform standards conversion to provide multi-standard connectivity, enabling IoT devices 504 using different protocols to communicate. Further systems may provide seamless interconnectivity across a multi-standard infrastructure comprising visible Internet resources and hidden Internet resources.

Communications in the cellular network 560, for instance, may be enhanced by systems that offload data, extend communications to more remote devices, or both. The LPWA network 562 may include systems that perform non-Internet protocol (IP) to IP interconnections, addressing, and routing. Further, each of the IoT devices 504 may include the appropriate transceiver for wide area communications with that device. Further, each IoT device 504 may include other transceivers for communications using additional protocols and frequencies. This is discussed further with respect to the communication environment and hardware of an IoT processing device depicted in FIGS. 7 and 8.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 6 below.

FIG. 6 illustrates a cloud computing network in communication with a mesh network of IoT devices (devices 602) operating as a fog device at the edge of the cloud computing network. The mesh network of IoT devices may be termed a fog 620, operating at the edge of the cloud 600. To simplify the diagram, not every IoT device 602 is labeled.

The fog 620 may be considered to be a massively interconnected network wherein a number of IoT devices 602 are in communications with each other, for example, by radio links 622. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 602 are shown in this example, gateways 604, data aggregators 626, and sensors 628, although any combinations of IoT devices 602 and functionality may be used. The gateways 604 may be edge devices that provide communications between the cloud 600 and the fog 620, and may also provide the backend process function for data obtained from sensors 628, such as motion data, flow data, temperature data, and the like. The data aggregators 626 may collect data from any number of the sensors 628, and perform the back end processing function for the analysis. The results, raw data, or both may be passed along to the cloud 600 through the gateways 604. The sensors 628 may be full IoT devices 602, for example, capable of both collecting data and processing the data. In some cases, the sensors 628 may be more limited in functionality, for example, collecting the data and allowing the data aggregators 626 or gateways 604 to process the data.

Communications from any IoT device 602 may be passed along a convenient path (e.g., a most convenient path) between any of the IoT devices 602 to reach the gateways 604. In these networks, the number of interconnections provide substantial redundancy, allowing communications to be maintained, even with the loss of a number of IoT devices 602. Further, the use of a mesh network may allow IoT devices 602 that are very low power or located at a distance from infrastructure to be used, as the range to connect to another IoT device 602 may be much less than the range to connect to the gateways 604.

The fog 620 provided from these IoT devices 602 may be presented to devices in the cloud 600, such as a server 606, as a single device located at the edge of the cloud 600, e.g., a fog device. In this example, the alerts coming from the fog device may be sent without being identified as coming from a specific IoT device 602 within the fog 620. In this fashion, the fog 620 may be considered a distributed platform that provides computing and storage resources to perform processing or data-intensive tasks such as data analytics, data aggregation, and machine-learning, among others.

In some examples, the IoT devices 602 may be configured using an imperative programming style. e.g., with each IoT device 602 having a specific function and communication partners. However, the IoT devices 602 forming the fog device may be configured in a declarative programming style, allowing the IoT devices 602 to reconfigure their operations and communications, such as to determine needed resources in response to conditions, queries, and device failures. As an example, a query from a user located at a server 606 about the operations of a subset of equipment monitored by the IoT devices 602 may result in the fog 620 device selecting the IoT devices 602, such as particular sensors 628, needed to answer the query. The data from these sensors 628 may then be aggregated and analyzed by any combination of the sensors 628, data aggregators 626, or gateways 604, before being sent on by the fog 620 device to the server 606 to answer the query. In this example, IoT devices 602 in the fog 620 may select the sensors 628 used based on the query, such as adding data from flow sensors or temperature sensors. Further, if some of the IoT devices 602 are not operational, other IoT devices 602 in the fog 620 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 7:
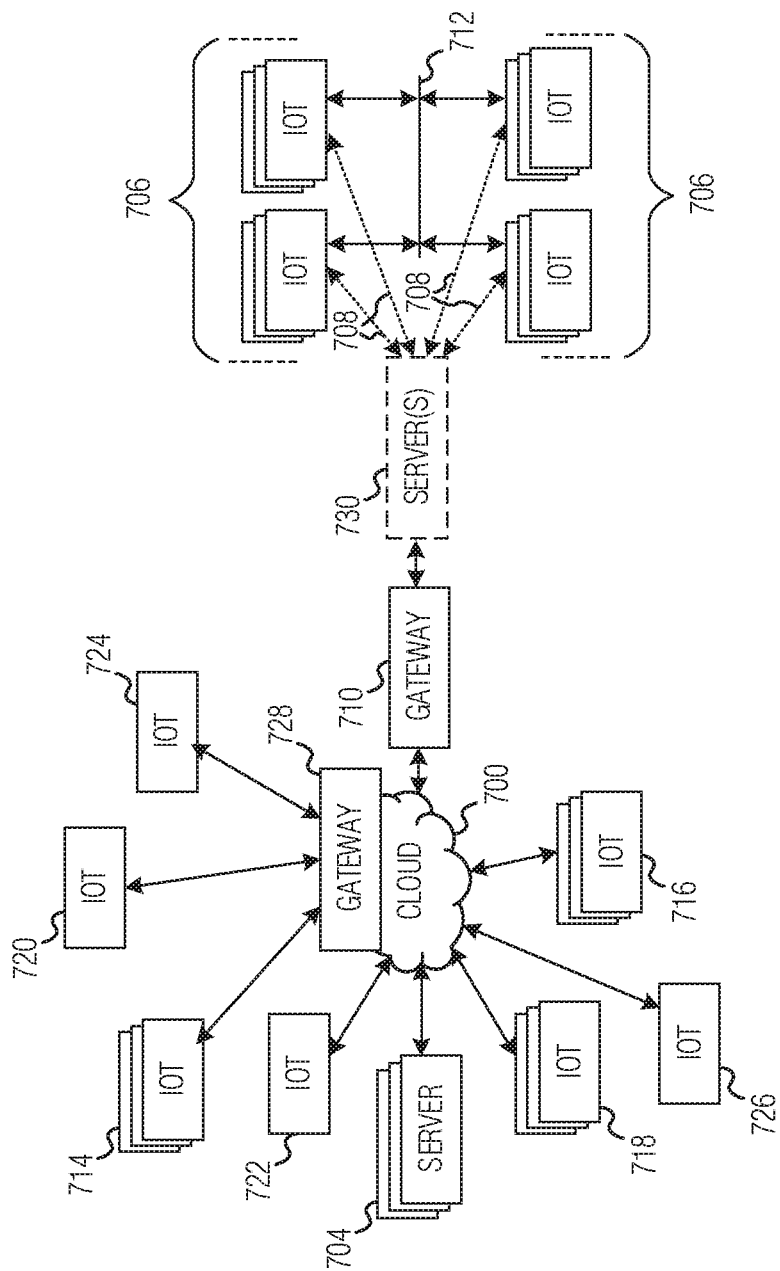
FIG. 7 illustrates a drawing of a cloud computing network, or cloud, in communication with a number of Internet of Things devices, according to an embodiment.

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIG. 6), or a combination therein. The groups of IoT devices may be deployed in various residential, commercial, and industrial settings (including in both private or public environments).

As may be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system (e.g., as described above with reference to FIG. 6).

Figure 8:
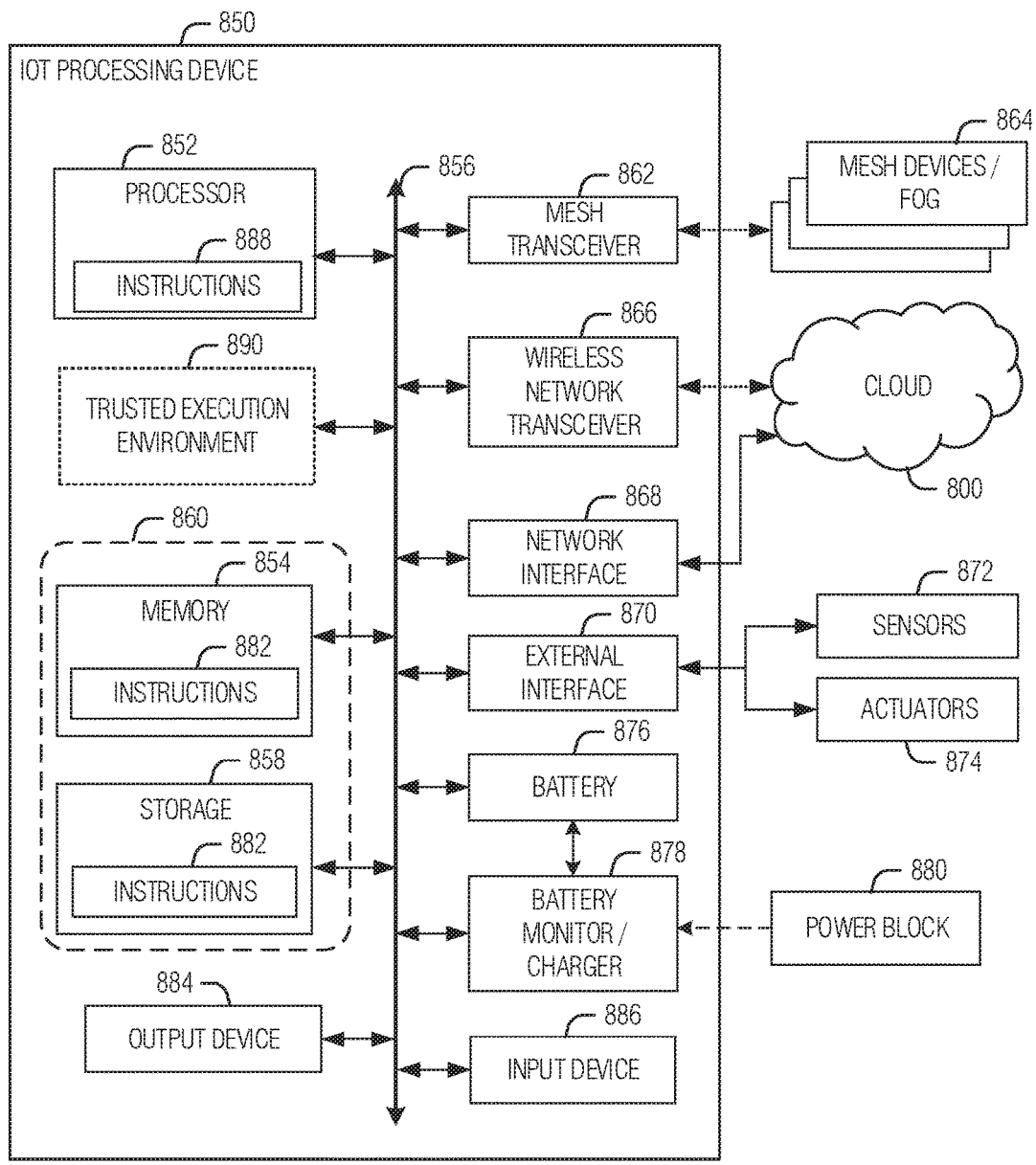
FIG. 8 is a block diagram of an example of components that may be present in an Internet of Things device, according to an embodiment.

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 or may include specific storage units such as optical disks, flash drives, or any number of other hardware devices. The non-transitory, machine readable medium 860 may further include, provide, or invoke instructions 888 to direct the processor 852 to perform a specific sequence or flow of actions, for example, as described with respect to the flowchart(s) and block diagram(s) of operations and functionality depicted above.

In an example, the instructions 888 on the processor 852 (separately, or in combination with the instructions 888 of the machine readable medium 860) may configure execution or operation of a trusted execution environment (TEE) 890. In an example, the TEE 890 operates as a protected area accessible to the processor 852 to enable secure access to data and secure execution of instructions. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 9:
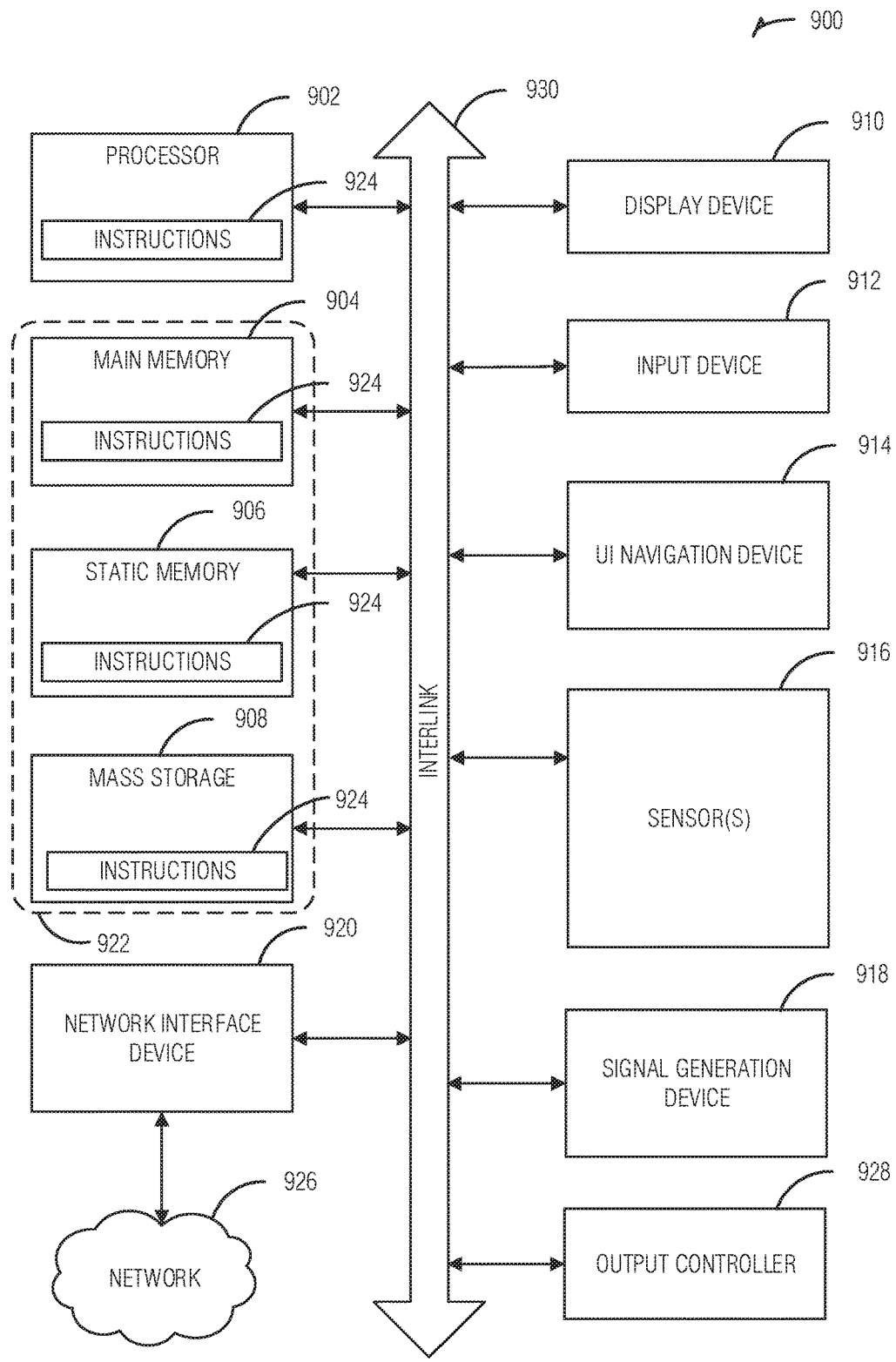
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

Figure 10:
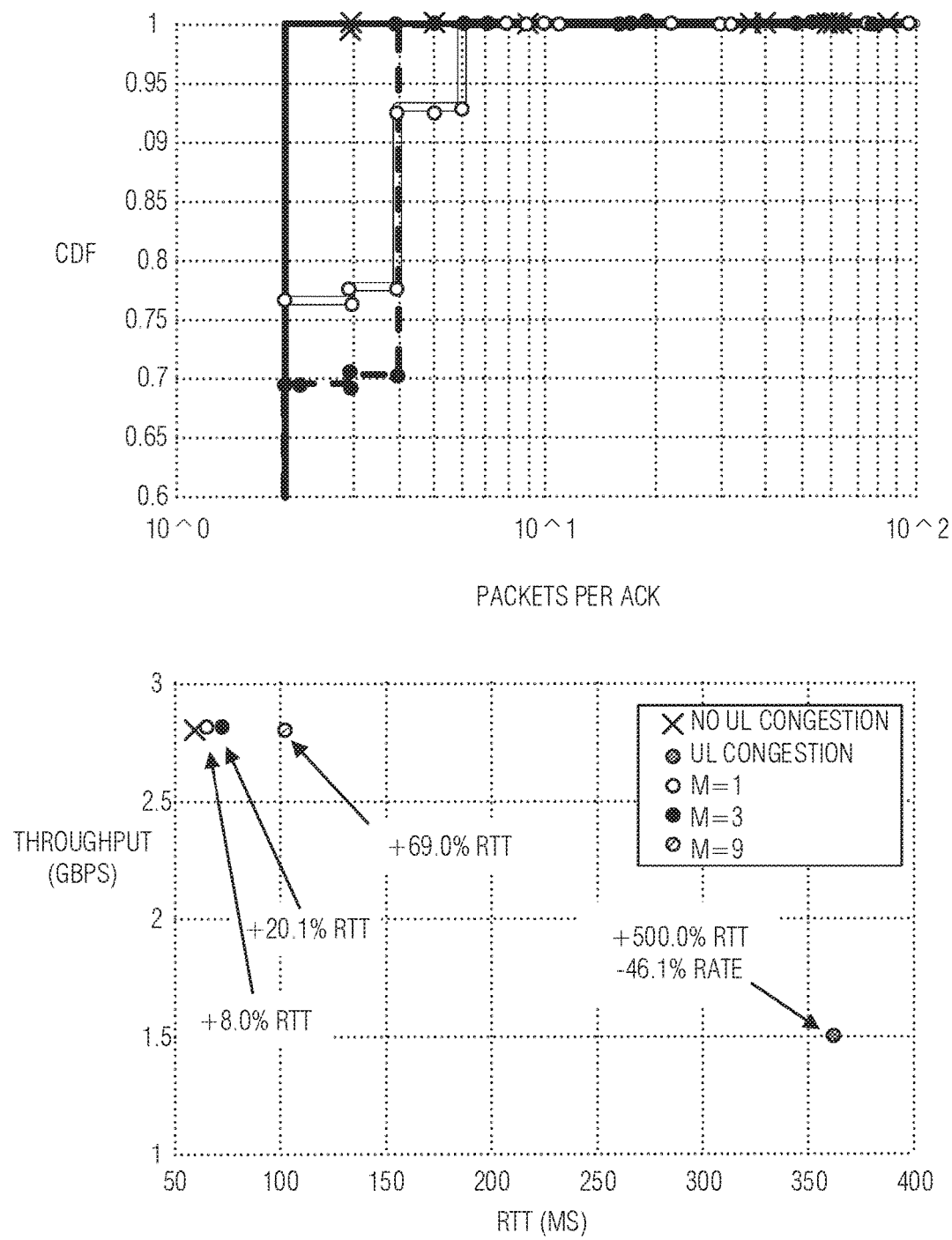
FIG. 10 illustrates an impact of the 'M' parameter on TCP e2e performance, according to an embodiment.

FIG. 10 illustrates an impact of the 'M' parameter on TCP e2e performance, according to an embodiment. This performance (e.g. throughput, round trip time) and traffic burstness was observed through simulation using the NS3-based 5G simulator (nyuwireless/ns3-mmwave).

CDF (cumulative distribution function) of the burst size, defined as the number of TCP data packets triggered by a TCP ACK packet, is used to measure burstness. The results show that the adaptive ACK filtering technique described above mitigates the UL congestion by reducing delay (round trip time) and increasing throughput. When M=1, the performance is very close to the case without UL congestion (the optimal point). M=3 provides slightly larger delay, but less burstness. Further increasing M to 9 increases delay but does not reduce burstness anymore in this example. Therefore, according to the parameters of this example, configuring M between 1 and 3 provides some benefit.

Figure 11:
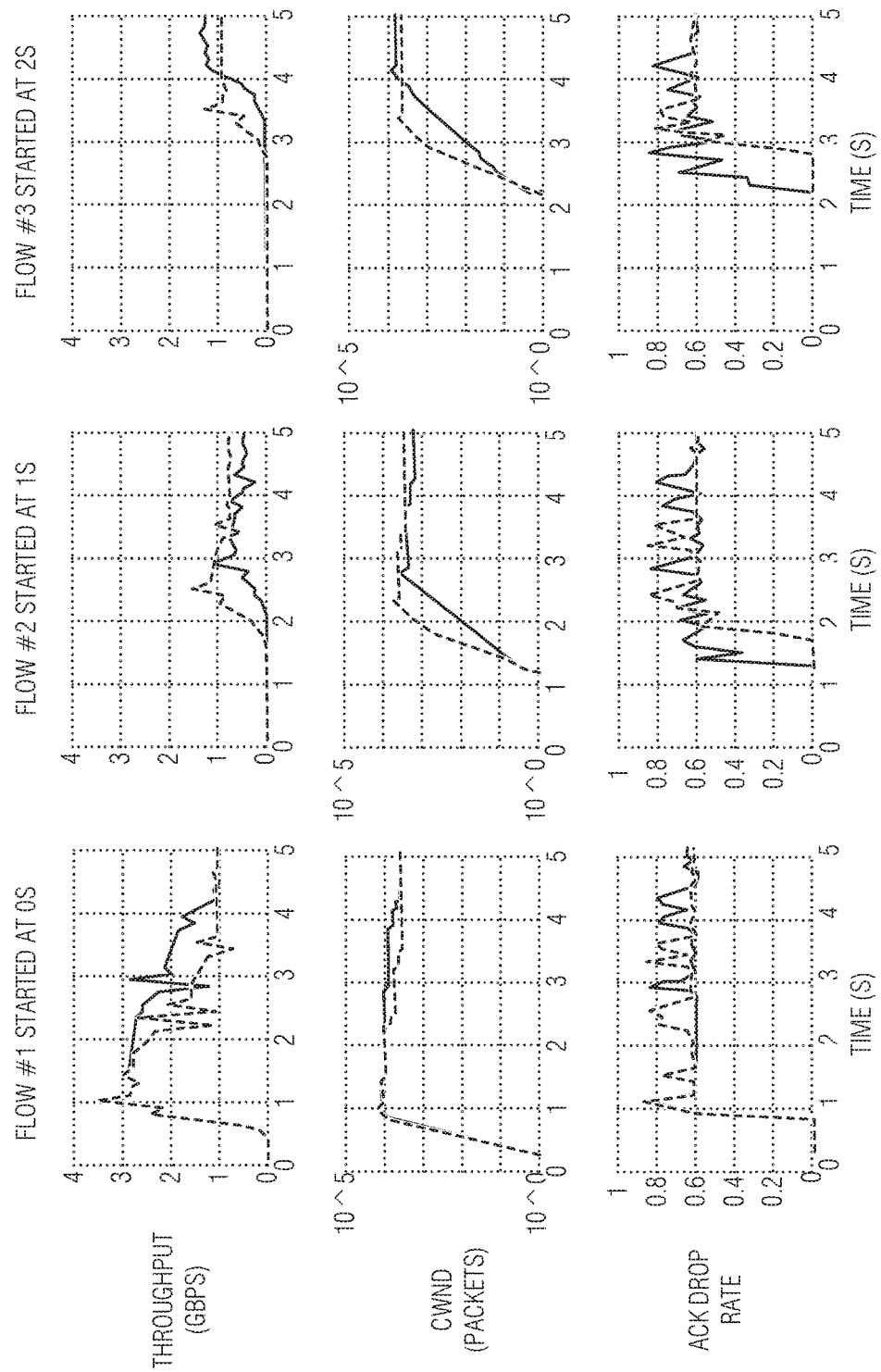
FIG. 11 illustrates an impact of ACK filtering TCP slow-start in a scenario involving multiple TCP flows sharing the same fifth-generation millimeter wave link, according to an embodiment.

FIG. 11 illustrates an impact of ACK filtering TCP slow-start in a scenario involving multiple TCP flows sharing the same fifth-generation millimeter wave link, according to an embodiment. The charts show that, with TCP slow-start detection, ACK filtering for the newly started flows may be skipped. As a result, the new flows grow their respective TCP congestion windows (Cwnds) faster, helping these flows converge faster.

Additional Notes & Examples

Example 1 is an apparatus for uplink congestion mitigation, the apparatus included in a communication device, the apparatus comprising: a buffer to store a transmission queue; and processing circuitry to: measure a packet acknowledgement (ACK) rate in a transmission queue to detect when the ACK rate exceeds a threshold; remove, in response to the ACK rate exceeding the threshold, ACKs from the transmission queue in accordance with a time-based uplink reduction function; and initiate transmission ACKs that remain in the transmission queue after ACKs are removed in accordance with the time-based uplink reduction function.

In Example 2, the subject matter of Example 1 includes, wherein the ACK rate is calculated by $$R = \frac{\{R*\max(0, (T-d)) + \min(d, T)r\}T}{T},$$

where R is the ACK rate, T is a measurement window, d is a measurement interval since a last sample, and r is an instant ACK rate.

In Example 3, the subject matter of Examples 1-2 includes, wherein the time-based uplink reduction function removes a percentage of ACKs to meet a percentage that corresponds to the threshold.

In Example 4, the subject matter of Example 3 includes, wherein the percentage is expressed as a reduced ratio of ACKS to keep over ACKs to remove.

In Example 5, the subject matter of Example 4 includes, wherein ACKs are removed in accordance with the ratio.

In Example 6, the subject matter of Examples 3-5 includes, wherein the time-based uplink reduction function includes a smoothing factor to smooth ACK bursts over multiple uplink grant intervals.

In Example 7, the subject matter of Examples 1-6 includes, wherein multiple traffic flows deposit ACKs into the transmission queue.

In Example 8, the subject matter of Example 7 includes, wherein, to remove the ACKs from the transmission queue, the processing circuitry removes ACKs from the multiple traffic flows in proportion to ACKs contributed by each of the multiple traffic flows.

In Example 9, the subject matter of Examples 1-8 includes, wherein the ACKs are transmission control protocol (TCP) ACKs.

In Example 10, the subject matter of Example 9 includes, wherein the processing circuitry is to remove the ACKS from the transmission queue at a packet data convergence protocol (PDCP) layer of a cellular communications stack.

In Example 11, the subject matter of Example 10 includes, wherein a physical layer of the network stack is a millimeter wave radio link.

In Example 12, the subject matter of Examples 9-11 includes, wherein multiple TCP streams deposit ACKs into the transmission queue, the multiple TCP streams including a TCP slow start flow.

In Example 13, the subject matter of Example 12 includes, wherein ACKs from the TCP slow start flow are not removed from the transmission queue.

Example 14 is a method for uplink congestion mitigation, the method comprising: measuring a packet acknowledgement (ACK) rate in a transmission queue to detect when the ACK rate exceeds a threshold; removing, in response to the ACK rate exceeding the threshold, ACKs from the transmission queue in accordance with a time-based uplink reduction function; and transmitting ACKs that remain in the transmission queue after ACKs are removed in accordance with the time-based uplink reduction function.

In Example 15, the subject matter of Example 14 includes, wherein the ACK rate is calculated by $$R = \frac{\{R*\max(0,\,(T-d)) + \min(d,\,T)r\}T}{T},$$

where R is the ACK rate, T is a measurement window, d is a measurement interval since a last sample, and r is an instant ACK rate.

In Example 16, the subject matter of Examples 14-15 includes, wherein the time-based uplink reduction function removes a percentage of ACKs to meet a percentage that corresponds to the threshold.

In Example 17, the subject matter of Example 16 includes, wherein the percentage is expressed as a reduced ratio of ACKS to keep over ACKs to remove.

In Example 18, the subject matter of Example 17 includes, wherein ACKs are removed in accordance with the ratio.

In Example 19, the subject matter of Examples 16-18 includes, wherein the time-based uplink reduction function includes a smoothing factor to smooth ACK bursts over multiple uplink grant intervals.

In Example 20, the subject matter of Examples 14-19 includes, wherein multiple traffic flows deposit ACKs into the transmission queue.

In Example 21, the subject matter of Example 20 includes, wherein removing the ACKs from the transmission queue includes removing ACKs from the multiple traffic flows in proportion to ACKs contributed by each of the multiple traffic flows.

In Example 22, the subject matter of Examples 14-21 includes, wherein the ACKs are transmission control protocol (TCP) ACKs.

In Example 23, the subject matter of Example 22 includes, wherein removing the ACKS from the transmission queue is performed at a packet data convergence protocol (PDCP) layer of a cellular communications stack.

In Example 24, the subject matter of Example 23 includes, wherein a physical layer of the network stack is a millimeter wave radio link.

In Example 25, the subject matter of Examples 22-24 includes, wherein multiple TCP streams deposit ACKs into the transmission queue, the multiple TCP streams including a TCP slow start flow.

In Example 26, the subject matter of Example 25 includes, wherein ACKs from the TCP slow start flow are not removed from the transmission queue.

Example 27 is at least one machine readable medium including instructions that, when executed by processing circuitry, cause the processing circuitry to perform any method of Examples 14-26.

Example 28 is a system comprising means to perform any method of Examples 14-26.

Example 29 is at least one machine readable medium including instructions for uplink congestion mitigation, the instructions, when executed by processing circuitry, cause the processing circuitry to perform operations comprising: measuring a packet acknowledgement (ACK) rate in a transmission queue to detect when the ACK rate exceeds a threshold; removing, in response to the ACK rate exceeding the threshold, ACKs from the transmission queue in accordance with a time-based uplink reduction function; and transmitting ACKs that remain in the transmission queue after ACKs are removed in accordance with the time-based uplink reduction function.

In Example 30, the subject matter of Example 29 includes, wherein the ACK rate is calculated by $$R = \frac{\{R*\max(0,\,(T-d)) + \min(d,\,T)r\}T}{T},$$

where R is the ACK rate, T is a measurement window, d is a measurement interval since a last sample, and r is an instant ACK rate.

In Example 31, the subject matter of Examples 29-30 includes, wherein the time-based uplink reduction function removes a percentage of ACKs to meet a percentage that corresponds to the threshold.

In Example 32, the subject matter of Example 31 includes, wherein the percentage is expressed as a reduced ratio of ACKS to keep over ACKs to remove.

In Example 33, the subject matter of Example 32 includes, wherein ACKs are removed in accordance with the ratio.

In Example 34, the subject matter of Examples 31-33 includes, wherein the time-based uplink reduction function includes a smoothing factor to smooth ACK bursts over multiple uplink grant intervals.

In Example 35, the subject matter of Examples 29-34 includes, wherein multiple traffic flows deposit ACKs into the transmission queue.

In Example 36, the subject matter of Example 35 includes, wherein removing the ACKs from the transmission queue includes removing ACKs from the multiple traffic flows in proportion to ACKs contributed by each of the multiple traffic flows.

In Example 37, the subject matter of Examples 29-36 includes, wherein the ACKs are transmission control protocol (TCP) ACKs.

In Example 38, the subject matter of Example 37 includes, wherein removing the ACKS from the transmission queue is performed at a packet data convergence protocol (PDCP) layer of a cellular communications stack.

In Example 39, the subject matter of Example 38 includes, wherein a physical layer of the network stack is a millimeter wave radio link.

In Example 40, the subject matter of Examples 37-39 includes, wherein multiple TCP streams deposit ACKs into the transmission queue, the multiple TCP streams including a TCP slow start flow.

In Example 41, the subject matter of Example 40 includes, wherein ACKs from the TCP slow start flow are not removed from the transmission queue.

Example 42 is a system for uplink congestion mitigation, the system comprising: means for measuring a packet acknowledgement (ACK) rate in a transmission queue to detect when the ACK rate exceeds a threshold; means for removing, in response to the ACK rate exceeding the threshold, ACKs from the transmission queue in accordance with a time-based uplink reduction function; and means for transmitting ACKs that remain in the transmission queue after ACKs are removed in accordance with the time-based uplink reduction function.

In Example 43, the subject matter of Example 42 includes, wherein the ACK rate is calculated by $$R = \frac{\{R * \max(0, (T - d)) + \min(d, T)r\}T}{T},$$

where R is the ACK rate, T is a measurement window, d is a measurement interval since a last sample, and r is an instant ACK rate.

In Example 44, the subject matter of Examples 42-43 includes, wherein the time-based uplink reduction function removes a percentage of ACKs to meet a percentage that corresponds to the threshold.

In Example 45, the subject matter of Example 44 includes, wherein the percentage is expressed as a reduced ratio of ACKS to keep over ACKs to remove.

In Example 46, the subject matter of Example 45 includes, wherein ACKs are removed in accordance with the ratio.

In Example 47, the subject matter of Examples 44-46 includes, wherein the time-based uplink reduction function includes a smoothing factor to smooth ACK bursts over multiple uplink grant intervals.

In Example 48, the subject matter of Examples 42-47 includes, wherein multiple traffic flows deposit ACKs into the transmission queue.

In Example 49, the subject matter of Example 48 includes, wherein the means for removing the ACKs from the transmission queue include means for removing ACKs from the multiple traffic flows in proportion to ACKs contributed by each of the multiple traffic flows.

In Example 50, the subject matter of Examples 42-49 includes, wherein the ACKs are transmission control protocol (TCP) ACKs.

In Example 51, the subject matter of Example 50 includes, wherein the means for removing the ACKS from the transmission queue is performed at a packet data convergence protocol (PDCP) layer of a cellular communications stack.

In Example 52, the subject matter of Example 51 includes, wherein a physical layer of the network stack is a millimeter wave radio link.

In Example 53, the subject matter of Examples 50-52 includes, wherein multiple TCP streams deposit ACKs into the transmission queue, the multiple TCP streams including a TCP slow start flow.

In Example 54, the subject matter of Example 53 includes, wherein ACKs from the TCP slow start flow are not removed from the transmission queue.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus for uplink congestion mitigation, the apparatus included in a communication device, the apparatus comprising:
a buffer to store a transmission queue; and
processing circuitry to:
measure a packet acknowledgement (ACK) rate in a transmission queue to detect when the ACK rate exceeds a threshold, wherein the ACK rate is calculated by:

$$R = \frac{\{R*\max(0, (T-d)) + \min(d, T)r\}T}{T}$$

where R is the ACK rate, T is a measurement window, d is a measurement interval since a last sample, and r is an instant ACK rate;
remove, in response to the ACK rate exceeding the threshold, ACKs from the transmission queue in accordance with a time-based uplink reduction function; and
initiate transmission ACKs that remain in the transmission queue after ACKs are removed in accordance with the time-based uplink reduction function.

2. The apparatus of claim 1, wherein the time-based uplink reduction function removes a percentage of ACKs to meet a percentage that corresponds to the threshold.

3. The apparatus of claim 1, wherein multiple traffic flows deposit ACKs into the transmission queue.

4. The apparatus of claim 3, wherein, to remove the ACKs from the transmission queue, the processing circuitry removes ACKs from the multiple traffic flows in proportion to ACKs contributed by each of the multiple traffic flows.

5. The apparatus of claim 1, wherein the ACKs are transmission control protocol (TCP) ACKs.

6. The apparatus of claim 5, wherein multiple TCP streams deposit ACKs into the transmission queue, the multiple TCP streams including a TCP slow start flow.

7. The apparatus of claim 6, wherein ACKs from the TCP slow start flow are not removed from the transmission queue.

8. The apparatus of claim 2, wherein the time-based uplink reduction function includes a smoothing factor to smooth ACK bursts over multiple uplink grant intervals.

9. A method for uplink congestion mitigation, the method comprising:
measuring a packet acknowledgement (ACK) rate in a transmission queue to detect when the ACK rate exceeds a threshold, wherein the ACK rate is calculated by:

$$R = \frac{\{R*\max(0, (T-d)) + \min(d, T)r\}T}{T}$$

where R is the ACK rate, T is a measurement window, d is a measurement interval since a last sample, and r is an instant ACK rate;
removing, in response to the ACK rate exceeding the threshold, ACKs from the transmission queue in accordance with a time-based uplink reduction function; and
transmitting ACKs that remain in the transmission queue after ACKs are removed in accordance with the time-based uplink reduction function.

10. The method of claim 9, wherein the time-based uplink reduction function removes a percentage of ACKs to meet a percentage that corresponds to the threshold.

11. The method of claim 9, wherein multiple traffic flows deposit ACKs into the transmission queue.

12. The method of claim 11, wherein removing the ACKs from the transmission queue includes removing ACKs from the multiple traffic flows in proportion to ACKs contributed by each of the multiple traffic flows.

13. The method of claim 9, wherein the ACKs are transmission control protocol (TCP) ACKs.

14. The method of claim 13, wherein multiple TCP streams deposit ACKs into the transmission queue, the multiple TCP streams including a TCP slow start flow.

15. The method of claim 14, wherein ACKs from the TCP slow start flow are not removed from the transmission queue.

16. The method of claim 10, wherein the time-based uplink reduction function includes a smoothing factor to smooth ACK bursts over multiple uplink grant intervals.

17. At least one non-transitory machine readable medium including instructions for uplink congestion mitigation, the instructions, when executed by processing circuitry, cause the processing circuitry to perform operations comprising:
measuring a packet acknowledgement (ACK) rate in a transmission queue to detect when the ACK rate exceeds a threshold, wherein the ACK rate is calculated by:

$$R = \frac{\{R*\max(0, (T-d)) + \min(d, T)r\}T}{T}$$

where R is the ACK rate, T is a measurement window, d is a measurement interval since a last sample, and r is an instant ACK rate;
removing, in response to the ACK rate exceeding the threshold, ACKs from the transmission queue in accordance with a time-based uplink reduction function; and
transmitting ACKs that remain in the transmission queue after ACKs are removed in accordance with the time-based uplink reduction function.

18. The at least one machine readable medium of claim 17, wherein the time-based uplink reduction function removes a percentage of ACKs to meet a percentage that corresponds to the threshold.

19. The at least one machine readable medium of claim 17, wherein multiple traffic flows deposit ACKs into the transmission queue.

20. The at least one machine readable medium of claim 19, wherein removing the ACKs from the transmission queue includes removing ACKs from the multiple traffic flows in proportion to ACKs contributed by each of the multiple traffic flows.

21. The at least one machine readable medium of claim 17, wherein the ACKs are transmission control protocol (TCP) ACKs.

22. The at least one machine readable medium of claim 21, wherein multiple TCP streams deposit ACKs into the transmission queue, the multiple TCP streams including a TCP slow start flow.

23. The at least one machine readable medium of claim 22, wherein ACKs from the TCP slow start flow are not removed from the transmission queue.

24. The at least one machine readable medium of claim 18, wherein the time-based uplink reduction function includes a smoothing factor to smooth ACK bursts over multiple uplink grant intervals.

* * * * *